US010586296B2

(12) United States Patent
Yang

(10) Patent No.: US 10,586,296 B2
(45) Date of Patent: Mar. 10, 2020

(54) FACILITATING DIAGNOSIS AND CORRECTION OF OPERATIONAL PROBLEMS

(71) Applicant: Tutor Group Limited, Taipei (TW)

(72) Inventor: Cheng-Ta Yang, Taipei (TW)

(73) Assignee: Tutor Group Limited, Hong Kong (CN)

( * ) Notice: Subject to any disclaimer, the term of this patent is extended or adjusted under 35 U.S.C. 154(b) by 319 days.

(21) Appl. No.: 15/236,377

(22) Filed: Aug. 12, 2016

(65) Prior Publication Data

US 2016/0350888 A1    Dec. 1, 2016

Related U.S. Application Data

(63) Continuation of application No. 12/837,555, filed on Jul. 16, 2010, now abandoned.

(30) Foreign Application Priority Data

Jul. 24, 2009    (TW) .............................. 098125108 A

(51) Int. Cl.
*G09B 5/00*    (2006.01)
*G06Q 50/20*    (2012.01)
(Continued)

(52) U.S. Cl.
CPC ............. *G06Q 50/20* (2013.01); *G06Q 30/02* (2013.01); *G09B 5/00* (2013.01); *G09B 5/02* (2013.01);
(Continued)

(58) Field of Classification Search
CPC .......... G09B 25/14; G09B 27/00; G09B 7/00; G06Q 10/10; G06Q 30/02
See application file for complete search history.

(56) References Cited

U.S. PATENT DOCUMENTS 5,727,950 A    3/1998  Cook et al.
5,823,788 A    10/1998  Lemelson et al.
(Continued)

FOREIGN PATENT DOCUMENTS

CN    1420448    5/2003
CN    1591516    3/2005
(Continued)

OTHER PUBLICATIONS

Taiwan Patent Application No. 098125108, "Office Action", dated Apr. 28, 2014, 5 pages (including 1 page English translation of marked portion of pp. 2-3 of Office Action ).

*Primary Examiner* — Robert J Utama
(74) *Attorney, Agent, or Firm* — Carr & Ferrell LLP

(57) ABSTRACT

An online learning management system for monitoring and maintaining the operational integrity of online teaching groups consisting of users distributed across a network is disclosed. The system comprises a management interface coupled to a teaching group and a teaching module configured to identify user operational problems within the group and to remove a user when an operational problem is identified. The system further comprises a managing module that inserts the user into a managing area when the user is removed from the teaching group, facilitates diagnosis and correction of the operational problem, and returns the user to the group when the operational problem has been corrected. The system further comprises a personalized operation interface that disables the user's connection to the group in response to the removal of the user from the group, and restores the user's connection when the operational problem has been corrected.

20 Claims, 7 Drawing Sheets

(51) Int. Cl.
*G06Q 30/02* (2012.01)
*G09B 7/00* (2006.01)
*G09B 5/02* (2006.01)
*H04L 12/26* (2006.01)
*H04L 29/06* (2006.01)

(52) U.S. Cl.
CPC .............. *G09B 7/00* (2013.01); *H04L 43/065* (2013.01); *H04L 65/1083* (2013.01); *H04L 65/403* (2013.01)

(56) References Cited

U.S. PATENT DOCUMENTS

| | | | |
|---|---|---|---|
| 5,957,699 A | 9/1999 | Peterson et al. | |
| 5,978,648 A | 11/1999 | George et al. | |
| 6,024,577 A | 2/2000 | Wadahama et al. | |
| 6,029,043 A * | 2/2000 | Ho | G09B 5/065 273/432 |
| 6,064,856 A | 5/2000 | Lee et al. | |
| 6,141,529 A | 10/2000 | Remschel | |
| 6,160,987 A | 12/2000 | Ho et al. | |
| 6,164,974 A | 12/2000 | Carlile et al. | |
| 6,261,103 B1 | 7/2001 | Stephens et al. | |
| 6,282,404 B1 | 8/2001 | Linton | |
| 6,302,698 B1 | 10/2001 | Ziv-El | |
| 6,325,632 B1 | 12/2001 | Chao et al. | |
| 6,505,031 B1 | 1/2003 | Slider et al. | |
| 6,554,618 B1 | 4/2003 | Lockwood | |
| 6,606,744 B1 | 8/2003 | Mikurak | |
| 6,615,020 B2 | 9/2003 | Richter et al. | |
| 6,652,287 B1 | 11/2003 | Strub et al. | |
| RE38,432 E | 2/2004 | Fai et al. | |
| 6,758,754 B1 | 7/2004 | Lavanchy et al. | |
| 6,760,748 B1 | 7/2004 | Hakim | |
| 6,813,474 B2 | 11/2004 | Robinson et al. | |
| 7,124,101 B1 | 10/2006 | Mikurak | |
| 7,305,465 B2 * | 12/2007 | Wing | G06Q 10/06 707/999.01 |
| 7,516,180 B2 | 4/2009 | Lacy | |
| 7,860,736 B2 | 12/2010 | Draper et al. | |
| 7,908,602 B2 | 3/2011 | Alcorn et al. | |
| 8,172,578 B2 | 5/2012 | Clark et al. | |
| 8,435,038 B2 | 5/2013 | Wilson et al. | |
| 2002/0055089 A1 | 5/2002 | Scheirer | |
| 2002/0064767 A1 | 5/2002 | McCormick et al. | |
| 2002/0146675 A1 | 10/2002 | Koga et al. | |
| 2002/0182578 A1 | 12/2002 | Rachman et al. | |
| 2002/0188583 A1 | 12/2002 | Rukavina et al. | |
| 2003/0028378 A1 | 2/2003 | August et al. | |
| 2003/0028588 A1 | 2/2003 | McConnell et al. | |
| 2003/0036046 A1 | 2/2003 | Smolover | |
| 2003/0039948 A1 | 2/2003 | Donahue | |
| 2003/0044761 A1 | 3/2003 | Houlihan et al. | |
| 2003/0152904 A1 | 8/2003 | Doty | |
| 2003/0186208 A1 | 10/2003 | Wen et al. | |
| 2004/0002040 A1 | 1/2004 | Foley et al. | |
| 2004/0009461 A1 | 1/2004 | Snyder et al. | |
| 2004/0110119 A1 | 6/2004 | Riconda et al. | |
| 2004/0131999 A1 | 7/2004 | Dresnick | |
| 2004/0139156 A1 | 7/2004 | Matthews et al. | |
| 2004/0153508 A1 | 8/2004 | Alcorn et al. | |
| 2004/0229199 A1 | 11/2004 | Ashley et al. | |
| 2004/0234937 A1 | 11/2004 | Watanabe | |
| 2005/0026131 A1 | 2/2005 | Elzinga et al. | |
| 2006/0035206 A1 | 2/2006 | Clark et al. | |
| 2006/0172274 A1 | 6/2006 | Nolasco | |
| 2006/0174121 A1 | 8/2006 | Omae et al. | |
| 2007/0096894 A1 * | 5/2007 | Lemmon | G08B 25/14 340/506 |
| 2008/0043626 A1 * | 2/2008 | Pham | H04L 41/12 370/241 |
| 2008/0172574 A1 * | 7/2008 | Fisher | G06Q 10/06 714/25 |
| 2009/0035733 A1 * | 2/2009 | Meitar | G09B 7/00 434/118 |
| 2009/0202114 A1 | 8/2009 | Morin et al. | |
| 2009/0307612 A1 * | 12/2009 | Singh | G06Q 10/10 715/758 |
| 2010/0159432 A1 | 6/2010 | German et al. | |
| 2011/0020781 A1 | 1/2011 | Yang | |
| 2015/0067052 A1 * | 3/2015 | Bounds | H04L 51/12 709/204 |
| 2017/0098379 A1 * | 4/2017 | Yang | G06Q 30/0271 |
| 2017/0221371 A1 | 8/2017 | Yang | |

FOREIGN PATENT DOCUMENTS

| | | |
|---|---|---|
| CN | 101154320 | 4/2008 |
| CN | 207037604 U | 2/2018 |
| JP | 3212833 U | 10/2017 |
| TW | 200516450 | 5/2005 |
| TW | I249112 | 2/2006 |
| TW | 200832298 | 8/2008 |
| TW | 201104645 | 2/2011 |
| TW | M549381 U | 9/2017 |
| TW | I622026 B | 4/2018 |

* cited by examiner

FACILITATING DIAGNOSIS AND CORRECTION OF OPERATIONAL PROBLEMS

CROSS REFERENCE TO RELATED APPLICATIONS

This application is a continuation and claims the priority benefit of U.S. Non-Provisional patent application Ser. No. 12/837,555, filed on Jul. 16, 2010, which claims the priority benefit of Taiwan Patent Application No. 098125108, filed on Jul. 24, 2009, which is hereby incorporated by reference herein in its entirety, including all references and appendices cited therein.

FIELD OF THE INVENTION

The present invention relates to methods and systems for facilitating diagnosis and correction of operational problems, and more particularly, it relates to facilitating the diagnosis and correction of operational problems that arise in online teaching groups consisting of users distributed across a network.

BACKGROUND

People usually read books and other information to learn different languages, and the most effective way is to attend language courses in schools. The teachers teach the courses and communicate with the learners to improve their language abilities. However, the time of these language courses is usually fixed, so it is very inconvenient for learners to arrange and allocate time daily or weekly for these courses, as most people nowadays have a busy time schedule. As a result, many interested learners eventually abandon their plans to learn a new language.

With the advancement of technology, the transmission speed over the internet has increased throughout the years. Therefore, people are beginning to learn new languages via the internet because it is more convenient. No matter where the learners are, they may download the video clips recorded by the teachers via the internet. To achieve maximum learning results, learners may also directly communicate with each other by video software. With this learning method, the learning process is no longer restricted by the place and the time of the language courses. However, learning by watching video clips is very similar to learning by reading books. Furthermore, the function of the video software is limited. As a result, the abovementioned learning method is not as effective as communicating with the teacher in the actual courses.

Moreover, due to the lack of the management functions of traditional learning systems, internet learners may only contact the system administrator via telephone or email when problems occur. The administrator may try to determine the problems from the descriptions provided by the learners, but the solutions to the problems may not be found in real-time. Therefore, it is important to develop a system which is able to provide user convenience and allow effective learning. At the same time, the system must be efficient and manageable for the system administrators.

SUMMARY

It is an objective of the present invention to provide an on-line interactive learning and managing system for users to learn interactively via the internet and such a system that administrators can manage easily. To achieve the above objective, an on-line interactive learning and managing system of the present invention comprises a server which enables a plurality of users to log in via the internet, and allocates the logged in users to create at least one teaching group. The server comprises a processor and a memory electrically coupled with the processor. The memory comprises a software program which is executed by the processor. The software program comprises a teaching module and a managing module. The teaching module is used to form each operation interface corresponding to each teaching group. The operation interface loads each set of personal settings corresponding to each user of the teaching group to form each personalized operation interface for interactive learning by each user.

The managing module forms a managing interface for management of the plurality of users by an administrator. The managing module may receive any message sent from any personalized operation interface and display the message on the managing interface. The teaching module may receive any message sent from the managing interface and display the message on the at least one personalized operation interface. The administrator and each user may thus communicate with each other.

Accordingly, the on-line interactive learning and managing system of the present invention enables the users to log in, and forms each personalized operation interface corresponding to each user for interactive learning. The administrator may monitor and manage each user via the managing interface. Each user and the administrator are able to communicate with each other via the personalized operation interface and the managing interface. It is more convenient for teaching and managing.

BRIEF DESCRIPTION OF THE DRAWINGS

These and other objectives and advantages of the present invention will become apparent from the following description of the accompanying drawings, which disclose several embodiments of the present invention. It is to be understood that the drawings are to be used for purposes of illustration only, and not as a definition of the invention. In the drawings, similar reference numerals denote similar elements throughout the several views.

DETAILED DESCRIPTION

Figure 1:
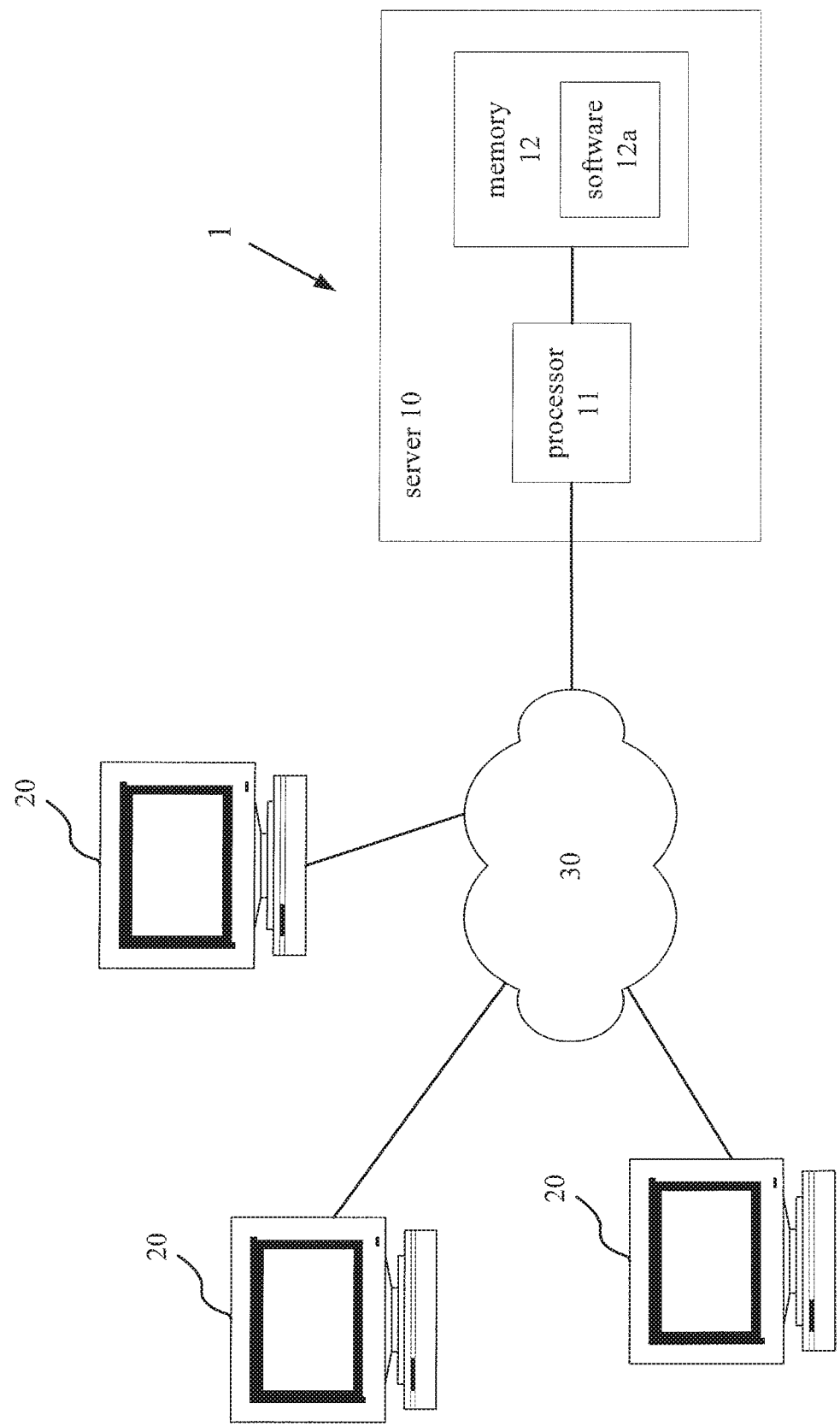
FIG. 1 is a schematic diagram of the on-line interactive learning and managing system of the present invention.

Please refer to FIG. 1, which is a schematic diagram of an on-line interactive learning and managing system of the present invention. As shown in FIG. 1, an on-line interactive learning and managing system 1 of the present invention comprises a server 10. A plurality of users may log in the server 10 via the internet with each user's computer 20, and then may utilize the on-line interactive learning and managing system 1 of the present invention to proceed with interactive learning. The server 10 comprises a processor 11 and a memory 12 electrically coupled with the processor 11. The memory 12 comprises a software program 12a, which is executed by the processor 11 and activates the learning and managing functions.

In this embodiment, the software program 12a is coded in flash language. Each user needs only to use the computer 20 to log into the server 10 of the on-line interactive learning and managing system 1 via the internet. The related operational interfaces may be formed and displayed via the computer 20. Therefore, each user does not have to install corresponding software in the computer 20. However, the present invention is not restricted to this method.

Figure 2:
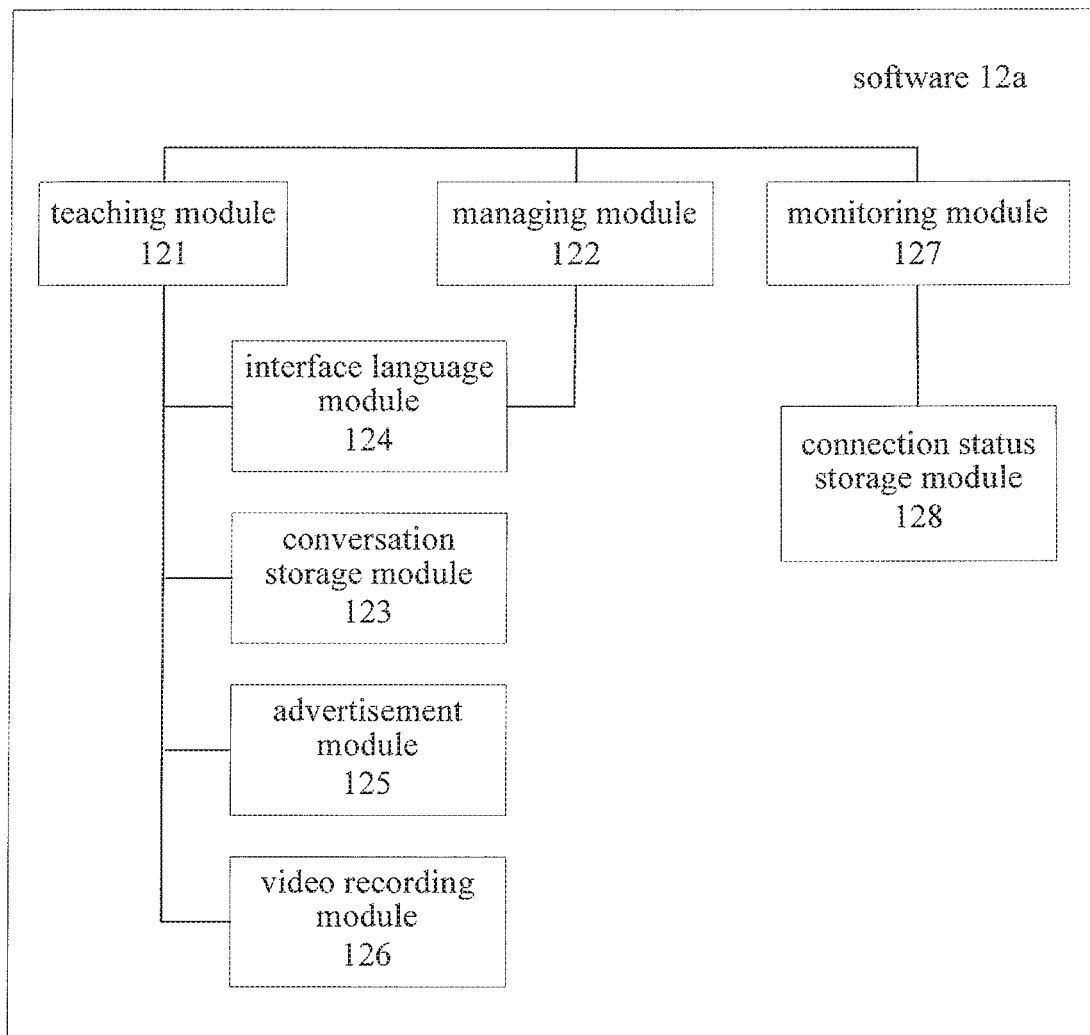
FIG. 2 is a schematic diagram showing a composition structure of a software program of the on-line interactive learning and managing system of the present invention.
Figure 3:
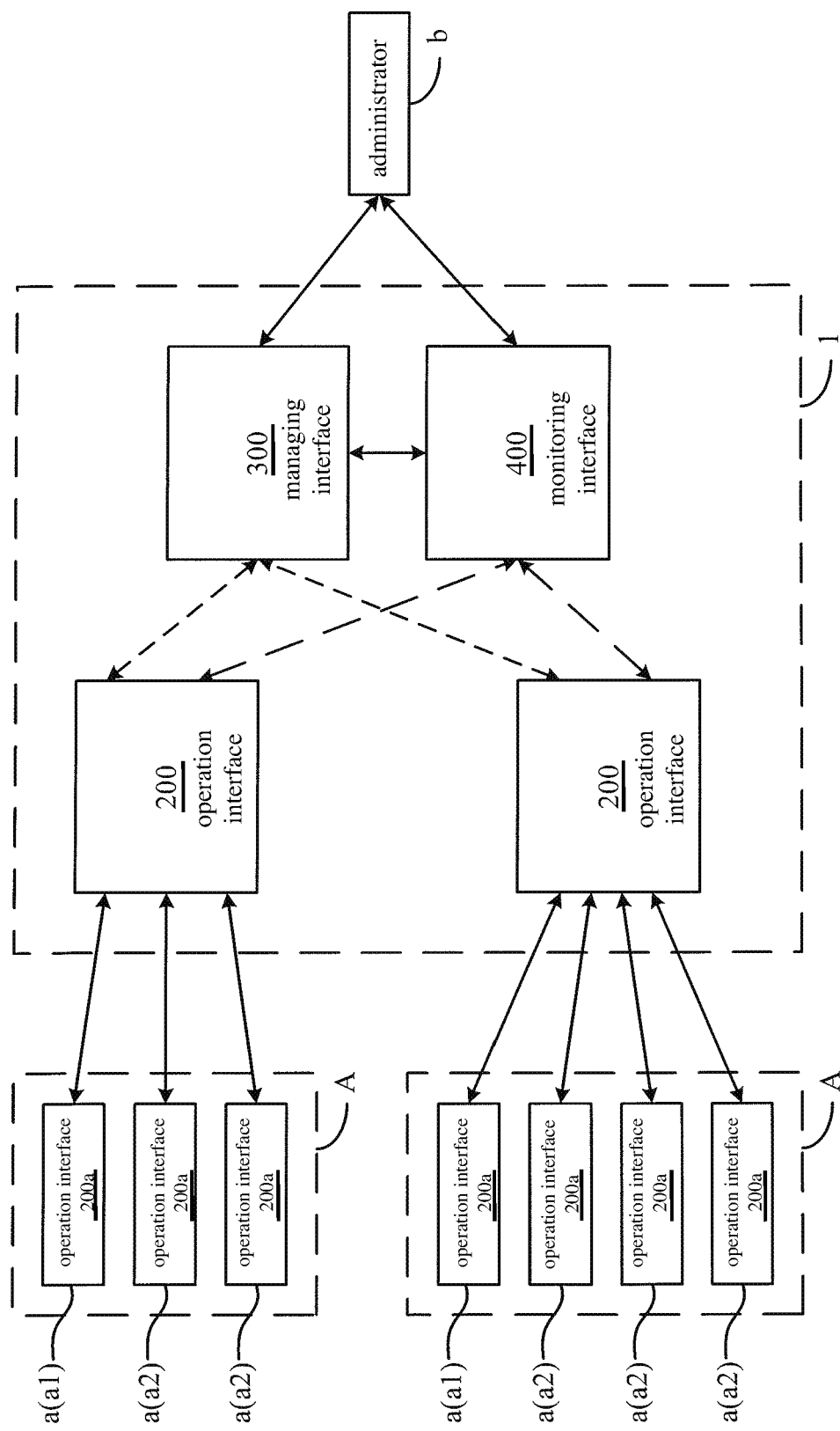
FIG. 3 is a schematic diagram showing an established connection status of the on-line interactive learning and managing system of the present invention.

Please refer to FIG. 2 and FIG. 3. FIG. 2 is a schematic diagram showing a composition structure of a software program 12a of the on-line interactive learning and managing system 1. FIG. 3 is a schematic diagram showing an established connection status of the on-line interactive learning and managing system 1. Each user's information is stored in the respective user's computer 20. When a user "a" logs into the on-line interactive learning managing system 1, the software program 12a will retrieve the user's information from the user's computer 20, and allocates the user "a" to join a predetermined teaching group "A" after comparing the user's information with course category data. The course category data is pre-loaded into the memory 12. All users may be allocated to form at least one teaching group "A" according to the number of users "a", different language levels of the users, and different identities of the users.

Each teaching group "A" is composed of a plurality of users "a", and each teaching group "A" comprises one teacher "a1" and at least one learner "a2". The related technique of categorizing the users according to each user's information is disclosed in Taiwan patent No. 1249112. Therefore, it will not be further described.

As shown in FIG. 2 and FIG. 3, the software program 12a comprises a teaching module 121 and a managing module 122. The teaching module 121 forms an operation interface 200 corresponding to each teaching group "A", and each teaching group "A" may proceed with interactive learning. The user's information of each user "a" comprises personal settings. When 10 the operation interface 200 is formed, the operation interface 200 will load the personal settings of each user "a" and forms each personalized operation interface 200a displayed on each user's computer 20. Each user may communicate and learn with other users of the same teaching group "A" via the personalized interface 200a. Furthermore, according to the different personal settings that are loaded, e.g. the personal settings of a teacher or a learner, the teaching module 121 may categorize each personalized operation interface 200a into a teacher's operational interface or a learner's operational interface. The different operational interfaces for teachers and learners have respective interface operation authorization 20 levels.

The managing module 122 forms a managing interface 300, which allows administrator "b" to manage the plurality of users "a" and to control the teaching and learning situation of each teaching group "A" by an administrator "b". When something needs to be communicated between the administrator "b" and any user "a", the administrator "b" and the user "a" may communicate with each other via the managing interface 300 and the personalized operation interface 200a. The user "a" may send messages via the personalized operation interface 200a, and the managing module 122 may receive messages for display on the managing interface 300 for notifying the administrator "b". The administrator "b" may also send messages via the managing interface 300, and the teaching module 121 may receive the messages for display on the personalized operation interface 200a of any designated single or multiple users "a".

The personal settings include interface function settings, data input authorization settings, or user information settings. The interface function settings are related to the settings of the personalized operation interface 200a displayed on the user's computer. The interface function settings comprise interface language settings, time settings, video settings, or sound settings.

The data input authorization settings are related to the input operation authorization settings of the personal operation interface 200a for the user "a". The input operating authorization settings comprise a character input authorization, a sound input authorization, or an interaction input authorization. The user information settings include the display name, hobbies, and other related settings of the user "a".

When the user "a" logs into the on-line interactive learning and managing system 1, the personal settings of the user "a" are also loaded. The language displayed on the personalized operation interface 200a may be changed according to different interface language settings. For example, the interface language may be displayed in, but is not limited to, simplified Chinese characters, traditional Chinese characters, or English letters. The time settings determine the time information being displayed on the personalized operation interface 200a. According to the different time settings, a local time of the user or/and a local time of the server may be displayed separately or simultaneously. It is convenient for the user to check the correct timing of the course from wherever the user logs in.

The video settings determine whether to display the video images on the personalized operation interface 200a. The sound settings determine the volume of the sound from an output device (e.g. amplifiers), or an input device (e.g. microphones). The personalized operation interface 200a may be customized according to the interface function settings so that each user "a" may learn interactively via an interface with which he or she is most familiar.

The interface function settings may be changed through the personal operation interface 200a, and the software program 12a may automatically save the changed interface function settings as the personal settings. The new personal settings will be loaded, and the personal operation interface 200a will be updated on the next occasions when the user "a" logs into the on-line interactive learning and managing system 1.

The character input authorization of the data input authorization settings determines whether the user "a" is able to input characters in the personalized operation interface 200a. The sound input authorization determines whether the user "a" is able to transmit a sound signal through the microphone to other users "a" of the same teaching group A. The interaction input authorization determines whether the user "a" is able to use teaching display data (such as teaching materials) for operating interactively via the personalized operation interface 200a. The personal settings corresponding to different identities of the users are different, so the data input authorization of the personalized operation interface 200a for each user "a" is different. For example, when the user "a" is a teacher "a1", the default of all of the data input authorization of the user "a" may be activated for teaching. When the user "a" is a learner "a2", he/she need only to listen, talk, and input characters to communicate with teacher "a1" and other learners "a2". The learner "a2" does not need to utilize the interaction input authorization, which is only required by the teacher "a1", and the default of the interaction input authorization should be closed for learner "a2". The default of the data input authorization in the above description may be adjusted according to different system requirements. However the present invention is not restricted to this method.

Furthermore, when the user "a" logs in, a nickname defined by the user "a" may be displayed on the personalized operation interface 200a according to the user information settings. Each user "a" may address one another with said nickname. The nickname of the user "a" is distinct from the account name of the user "a".

Figure 4:
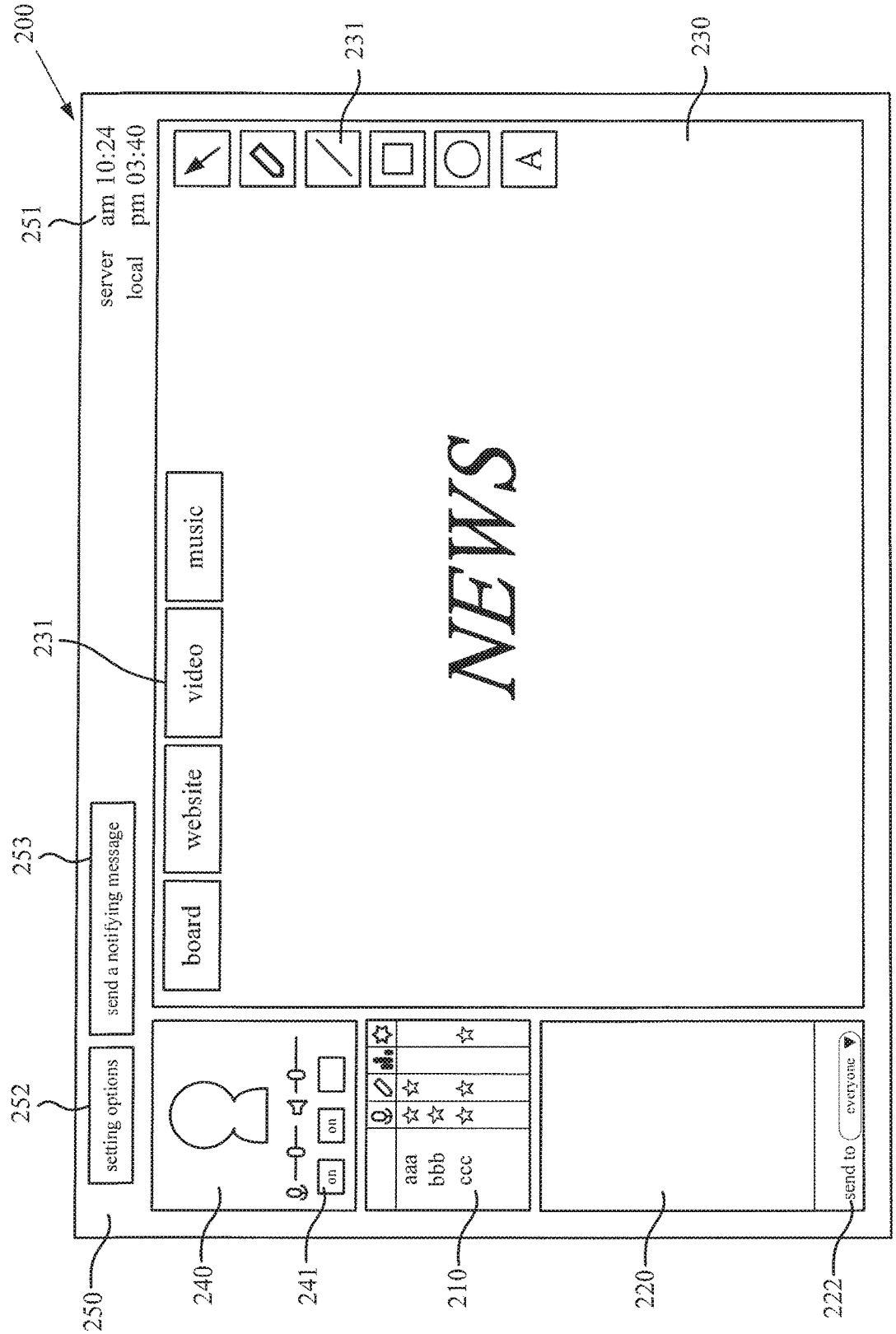
FIG. 4 is a schematic diagram showing a personalized operation interface of the on-line interactive learning and managing system of the present invention.

Please refer to FIG. 2 and FIG. 4. FIG. 4 is a schematic diagram showing a personalized operation interface 200a of the on-line interactive learning and managing system of the present invention. As shown in FIG. 2 and FIG. 4, each personalized operation interface 200a formed by the teaching module 121 comprises a status display area 210, a real-time communication area 220, an interactive display area 230, a video display area 240, and an interface function settings area 250.

The status display area 210 displays each user's status information, and the status information comprises a user connection status, a user identity status, or an input authorization status. The user connection status determines whether the user's internet connection is stable. The user identity status is used for confirming the user's identity. The input authorization status determines the data input authorization of the user. Accordingly, the status information of each user of the same teaching group may be displayed in the status display area 210. However, the present invention is not only limited to these types of information.

The real-time communication area 220 displays the text messages typed by the users of the same teaching group, which allows two or more users to communicate with each other. The text messages typed by each user in the real-time communication area 220 may be sent via a function option 222 to specific users, such as the teacher or a specific learner, or to all users of the same teaching group, and the messages may be sent in a private or public manner. The user may also communicate with the administrator directly through text messages. As shown in FIG. 2 and FIG. 4 of the on-line interactive learning and managing system 1, the software program 12a further comprises a conversation storage module 123, which is used to save all message conversations that each user has entered as text in the real-time communication area 220 of the personalized operation interface 200a. As a result, the text messages of the conversations can be searched in the future if needed.

The interactive display area 230 provides functions similar to a digital white-board. The teaching module 121 may load teaching display data and display the data on the interactive display area 230 of the personalized operation interface 200a. Usually, the teaching display data is provided by the teacher with the interaction input authorization. The teaching display data may be selected and operated (such as inputting characters, footnoting, or drawing lines on the teaching display data) by a function bar 231 of the interactive display area 230. The learner whose interaction input authorization is active may also use the related function of the interactive display area 230. The teaching display data may comprise documents (such as documents generated in word-processing software or digital slideshow files), web data, or multimedia files (such as video or audio files). Furthermore, the teaching display data corresponding to each teaching group may be pre-loaded by the system onto the interactive display area 230 of each personalized operation interface 200a, and each learner may preview the teaching display data.

The video display area 240 displays the video images captured from the teacher's side, such as using a webcam to capture the teacher's real-time image to simulate the situation of face-to-face teaching and learning. The video display area 240 comprises a video function bar 241, which allows users to activate or disable the video images, activate or disable the audio input/output, and adjust the volume of the audio input/output. For example, if the user activates the video image while the network is congested, the image transmission may be delayed. In such a case, the user may choose to disable the video images in order to allow the personalized operation interface 200a to operate more swiftly.

The interface function settings area 250 provides options and display of some interface functions, and the functions comprise a time display 251, an interface function option 252, and a communication assistance function option 253. The time display 251 is set in accordance with the personal settings, and the corresponding time is displayed. The user may check the actual time of the course, no matter where the user may be. The interface function option 252 may be used for adjusting the related functions of the personalized interface 200a, and it comprises the options of the interface language settings or the time settings. The user may scroll down the option list to choose the options for the adjustments. The software program 12a further comprises an interface language module 124, and the interface language module 124 stores multiple interface languages. The language displayed on the personalized operation interface 200a may be changed via the interface function settings area 250 of the personalized operation interface 200a. For example, the predefined language setting in the personalized operation interface 200a is traditional Chinese. When a user's first language is English, the language on the personalized operation interface 200a may be changed to English by the interface function settings area 250. The change of the interface language settings is stored in the user's personal settings, and the personalized operation interface 200a will retain its English interface if the language setting remains unchanged.

The communication assistance function option 253 allows the learners to respond to the teacher regarding the problems in learning, or allows the learners or the teacher to respond to the administrator regarding the problems in using the interface, and reminds the administrator to respond to the problems. Using the communication with the administrator as an example, any learner or teacher may choose the most appropriate option via the communication assistance function option 253 when a problem arises (such as delays in communication, or the audio of the counterpart cannot be heard), or directly type text messages to notify the administrator regarding the problems. A notifying message may be sent to the managing module 122 according to the messages typed or the option chosen by any learner or teacher via the personalized operation interface 200a. Then, the managing module 122 may display a prompting message corresponding to the notifying message on the managing interface 300 to remind the administrator to solve the problem.

To ensure the convenience of teaching and to prevent some users from trying to disturb the course, more management authorization may be provided to the teacher of each teaching group in the online-interactive learning managing system 1 of the present invention. Therefore, a function for altering the data input authorization settings of any learner's operation interface via the teacher's operation interface is added in the design of the present invention. The teacher may evaluate the situation of the course and change any learner's data input authorization settings via the teacher's operation interface. For example, when a learner wants to share a document or a video during the course, the teacher may activate the learner's interaction input authorization such that the learners may provide and display related files in the interactive display area 230. If a learner attempts to disrupt the course by constantly sending inappropriate, vulgar, or irrelevant messages in the real-time communication area 220, the teacher may disable that learner's character input authorization to stop the disruption.

The software program 12*a* further comprises an advertisement module 125 that stores multiple advertisement data. When the personalized operation interface 200*a* is formed, the software program 12*a* combines at least one advertisement data with the corresponding personalized operation interface 200*a* via the advertisement module 125. The user may see the advertisement data when using the personalized operation interface 200*a*. The advertisement module 125 chooses the suitable advertisement data to combine with each personalized operation interface 200*a* according to special events or the user's personal settings, e.g. the teaching group for 5 data on hobbies in the personal information settings, such as "movies" or "electronic products". Accordingly, the advertisement module 125 may choose a corresponding movie trailer or an advertisement for electronic products, and combine it with the user's personalized operation interface 200*a*, so that the users will receive additional information during the course.

The software program 12*a* further comprises a video recording module 126, which is used for recording the teaching process of each teaching group via the operating interface 200 to form recording files. When the teaching module 121 forms an operation interface 200 for any respective teaching group, the video recording module 126 is activated and records the teaching process of the teaching group, as well as recording the operations and video data of the operation interface 200. Therefore, the learners who could not attend the course or want to review the class may view the recording files of the course after the course has ended. Furthermore, when the users log into the server to view the recording files, the advertisement module 125 may also choose a suitable advertisement data according to each user's personal information settings and insert the advertisement data into the recording files.

Figure 5A:
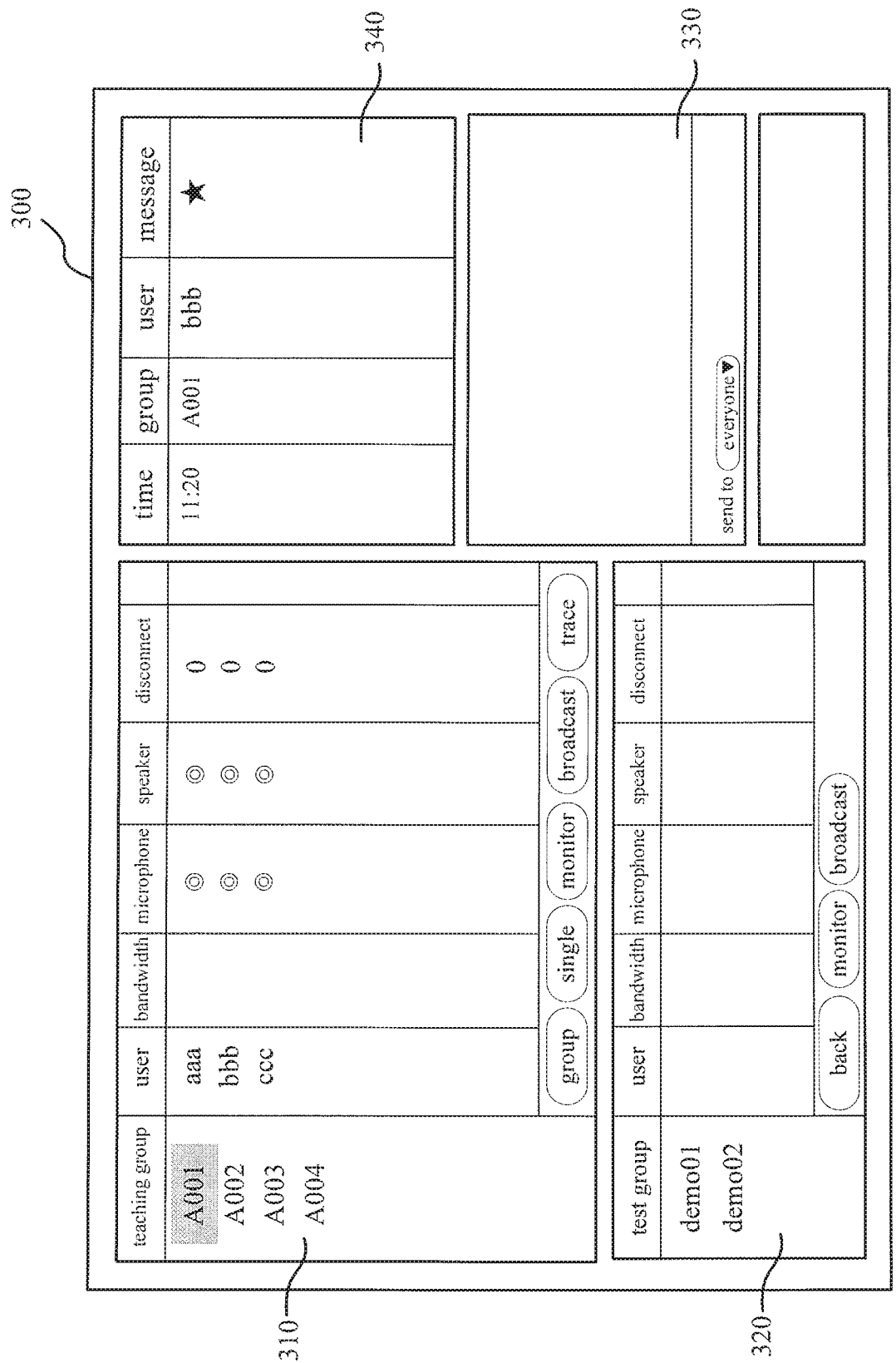
FIG. 5(a) and FIG. 5(b) are schematic diagrams showing a managing interface of the on-line interactive learning and managing system of the present invention.
Figure 5B:
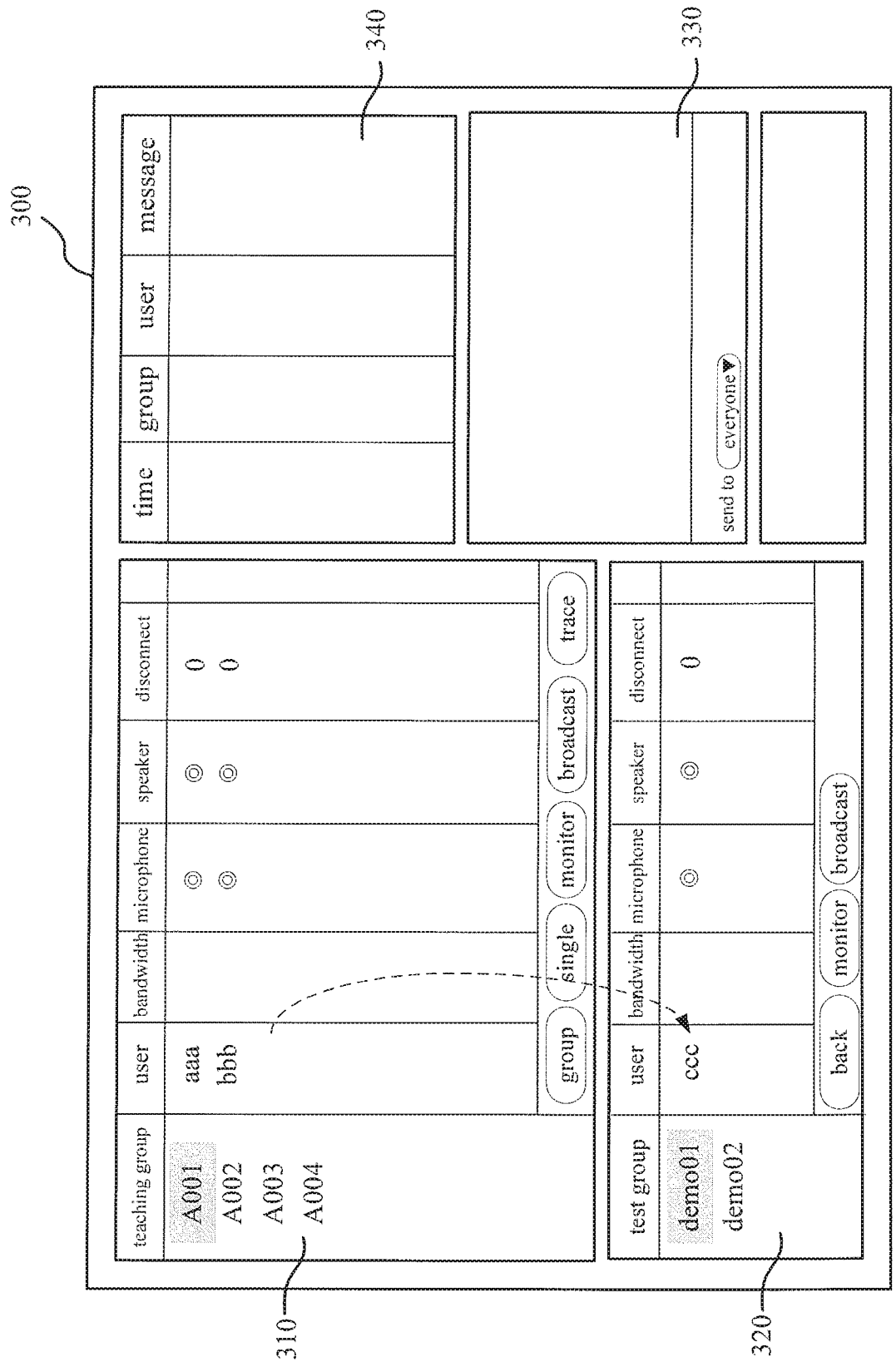

Please refer to FIG. 2, FIG. 5(*a*) and FIG. 5(*b*). FIG. 5(*a*) and FIG. 5(*b*) are schematic diagrams showing a managing interface 300 of the on-line interactive learning and managing system 1 of the present invention. As shown in FIG. 2 and FIG. 5(*a*), a managing interface 300 may be formed when an administrator's account is logged into the on-line interactive learning and managing system 1, and the administrator may monitor the situation of each teaching group or each user by the managing interface 300. The administrator may communicate with each user to help them to solve problems in operating the interface by the managing interface 300. The managing interface 30 comprises a teaching group managing area 310, a test group managing area 320, a real-time communication area 330, and a message display area 340. The teaching group managing area 310 displays status information of all the current users of each teaching group for managing by the administrator. The status information comprises a connection status of each user and a sound input/output status.

The administrator may use a mouse or other input device to choose any teaching group or any user on the managing interface 300 and enter a command to monitor the current course situation of the teaching group or the user. When the administrator determines that a user disturbs the course, he may input a command via the managing interface 300 and remove the user from the teaching group. At the same time, the personalized operation interface 200*a* of the user may be closed. Conversely, the administrator may also restore a removed user back into the teaching group and activate the user's personalized operation interface 200*a* in order to continue with the course.

The test group managing area 320 is used to test the user's usage status. Please refer to FIG. 5(*a*) and FIG. 5(*b*). The test group managing area 320 may preset at least one test group (demo01 and demo02 as shown in the figure). When a user ccc within the teaching group encounters an operation problem (such as unclear audio or an unstable connection), the administrator may remove the user ccc from its corresponding teaching group AOO 1 of the teaching group managing area 310 and then place the user ccc into the test group demo01 of the test group managing area 320 according to the operation of the managing interface 300 with the aid of a mouse or other input method. At this point, the system may disable the personalized operation interface 200*a* of the user ccc so that the administrator may proceed with related status testing for the user ccc to solve the problem. When the problem is solved, the administrator will input another command to move the user ccc from the test group demo0 1 of the test group managing area 320 back into the teaching group A001 of the teaching group managing area 310. Then the personalized operation interface 200*a* of the user ccc may be enabled for continuing with the course.

The real-time communication area 330 displays the messages typed by each administrator so that the administrators are able to communicate with one another. The multiple administrators are required to manage a portion of the teaching groups when there are many learners logging into the course at the same time. Therefore, the real-time communication area 330 provides a way for the administrators to communicate with one another and support one another in times of need. The messages typed by any administrator in the real-time communication area 330 may also be sent to any specific user, and text messages sent from any personalized operation interface 200*a* may be displayed via the real-time communication area 330. Therefore, the user may privately communicate with the administrator.

The message display area 340 is used to display prompting messages. As shown in FIG. 5(*a*), when a user has a system operational problem or other unsolvable problems, the user may send a notification message via the communication assistance function option 253 of the personalized operation interface 200*a*. The notification message may be transmitted over the internet and then received by the managing module 122. The managing module 122 may display a prompting message corresponding to the notification message via the message display area 340 of the managing interface 300. The administrator will know which user has the problem or what the problem is according to the prompting message. The administrator may directly contact the user via the managing interface 300, or move the user into the test group for testing and analyze the problem by the abovementioned function. The prompting message displayed on the message display area 340 may display the user information of the user who sent the message, and display the descriptions or drawings of the problem (as indicated by the star sign in the figure), such that the administrator may understand the problem immediately. As a result, the on-line interactive learning and managing system 1 of the present invention is able to solve the user's problem without disturbing the course.

When a system announcement (or an alert) needs to be broadcast to all the logged-in users, the administrator may send an announcement data via the managing interface 300. The announcement data may be received and processed by the teaching module 121 for display via each personalized operation interface 200a to notify all users.

As shown in FIG. 2 and FIG. 3, the software program 12a further comprises a monitoring module 127, which creates a monitoring interface 400 to help the administrator with controlling the status of the server 10 and the connection status of each user. The administrator may monitor and adjust the related settings of the system via the monitoring interface 400, e.g. on-line bandwidth settings, video size adjustments, a number of activated classes, or a number of users currently on-line. The monitoring module 127 further comprises a connection status storage module 128, which monitors the connection status of each user and stores each user's connection status data as a connection status record respectively for searching. The connection status data comprises a user connection address, a time record of log-inllog-out, an internet flow bandwidth, or abnormal data.

When the connection status of a user's computer is unstable or the user's computer may not connect to the on-line interactive learning and managing system 1 of the present invention, the administrator may retrieve the connection status data of a single user or multiple users of the teaching group from the monitoring module 127 via the monitoring interface 400, or retrieve the connection status data of a single user from the monitoring module 127 via the managing interface 300. Accordingly, the problem may be identified as one that takes place at the user's side or one that takes place at the server's side by the connection status data to help to solve the problem.

Figure 6:
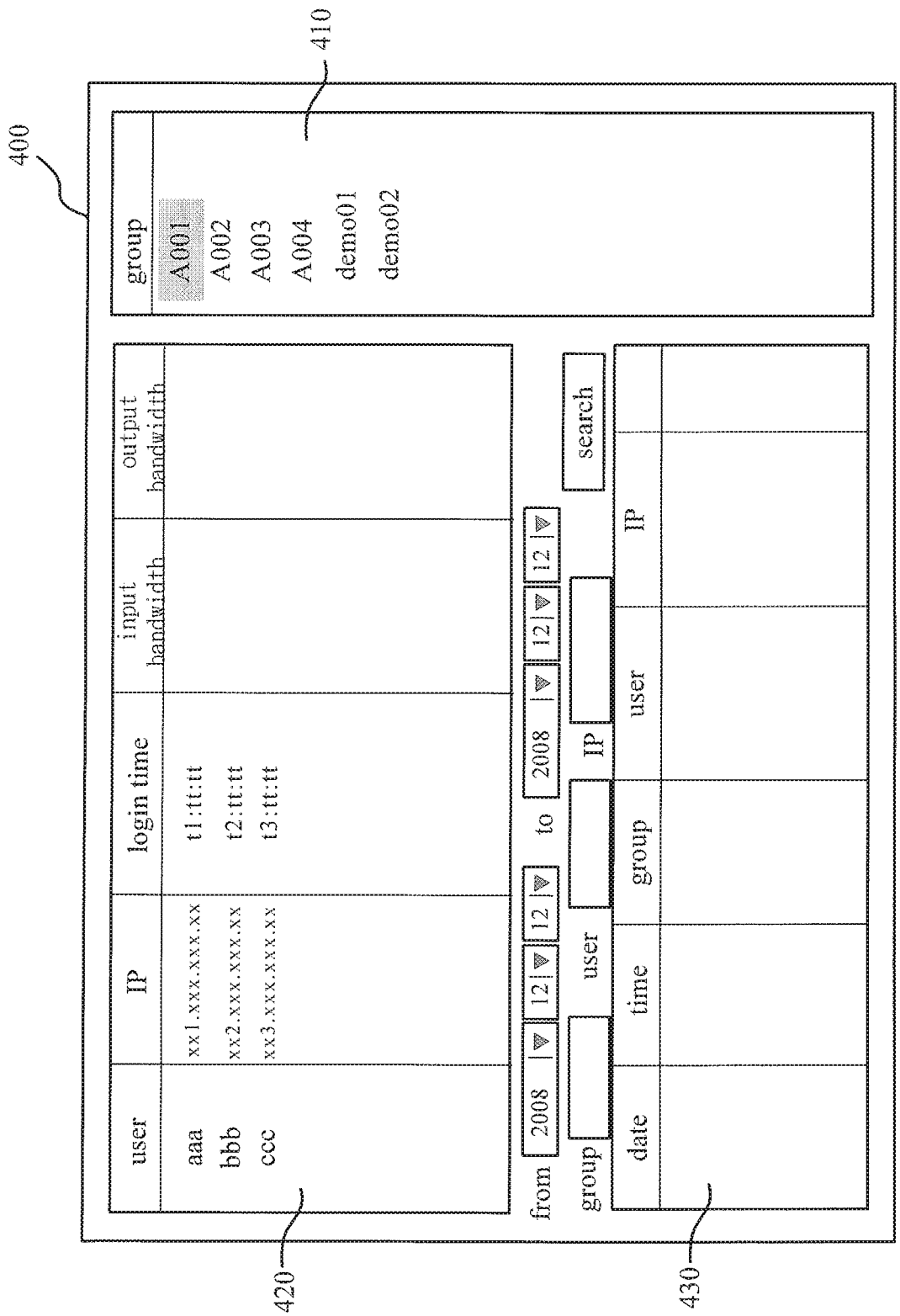
FIG. 6 is a schematic diagram showing a monitoring interface of the on-line interactive learning and managing system of the present invention.

Refer to FIG. 6. FIG. 6 illustrates the diagram of the monitoring interface 400 of the on-line interactive learning and managing system 1 of the present invention. As shown in FIG. 6, the monitoring interface 400 comprises an on-line group display area 410, and a connection status display area 420. The on-line group display area 410 lists all existing groups currently within the system, including each teaching group or each testing group. The connection status display area 420 displays all connection status data of each user of the at least one group chosen by the on-line group display area 410 in real-time. In this embodiment, the connection status data comprises a user account, a connection address, a time of log-in, and an internet flow bandwidth, but the present invention is not restricted to these items.

The monitoring interface 400 further comprises a connection record search area 430. The administrator may input search conditions (such as date, user name, or teaching group) via the connection record search area 430 to search all of the connection status data records of users stored in the connection status storage module 128. Then, the connection status history data records corresponding to the input search conditions may be found and displayed via the monitoring interface 400. Accordingly, the administrator may analyze and obtain all the related information easily.

The design of the on-line interactive learning and managing system 1 of the present invention allows users to directly log into the server 10 to learn interactively via each corresponding personalized operation interface 200a. The administrators logged into the server 10 may control and monitor every user via the managing interface 300 and the monitoring interface 400. When a user has a problem, the user and the administrator may communicate with each other via the personalized operation interface 200a and the managing interface 300. When a connection problem between any user's computer and the server 10 occurs, the administrator may efficiently analyze and identify the problem by the monitoring interface 400.

Although the present invention has been explained in relation to its preferred embodiments, it is also of vital importance to acknowledge that many other possible modifications and variations can be made without departing from the spirit and scope of the invention as hereinafter claimed.

What is claimed is:

1. An online learning management system for monitoring and maintaining operational integrity of online teaching groups comprising students and teachers distributed across a network, the system comprising:
   a management interface coupled to at least one teaching group comprising users, the users comprising at least one student and one teacher;
   a teaching module within the management interface comprising:
      at least one processor; and
      a memory storing processor-executable instructions, wherein the at least one processor is configured to implement the following operations upon executing the processor-executable instructions:
         identifying user operational problems within the teaching group; and
         removing a user from the teaching group when an operational problem of the user is identified;
   a managing module, coupled to the management interface, comprising:
      at least one processor; and
      a memory storing processor-executable instructions, wherein the at least one processor is configured to implement the following operations upon executing the processor-executable instructions:
         inserting the user into a test group managing area when the user is removed from the teaching group; and
         facilitating diagnosis and correction of the operational problem and returning the user to the teaching group when the operational problem has been corrected;
   a personalized operation interface, coupled to the teaching module, that stores and manages a connection of the user to the teaching group, wherein the personalized operation interface disables the connection of the user to the teaching group in response to the removal of the user from the teaching group when the operational problem is identified and further restores the connection of the user to the teaching group when the operational problem has been corrected and the managing module returns the user to the teaching group;
   a monitoring interface, coupled to a monitoring module and a connection status storage module, the connection status storage module comprising:
      at least one processor; and
      a memory storing processor-executable instructions, wherein the at least one processor is configured to implement the following operations upon executing the processor-executable instructions:

monitoring a connection status of the user to the teaching group, the connection status comprising a status of the connection of the user to the teaching group;
storing connection status data of the user as a connection status record for searching, the connection status data comprising a user connection address, a time record of logging-in and logging-out, and an internet flow bandwidth; and
identifying the operational problem as taking place via the user or via a server of the management interface using the connection status data;
a video recording module, coupled to the personalized operation interface, comprising:
at least one processor; and
a memory storing processor-executable instructions, wherein the at least one processor is configured to implement the following operations upon executing the processor-executable instructions:
recording a teaching process of the teaching module via the personalized operation interface to form a recording file; and
an advertisement module, coupled to the video recording module, comprising:
at least one processor; and
a memory storing processor-executable instructions, wherein the at least one processor is configured to implement the following operations upon executing the processor-executable instructions:
determining advertisement data according to personal information settings of the user, the personal information settings of the user comprising special events; and
inserting the advertisement data into the recording file.

2. The system of claim 1, wherein the managing module receives a message from the personalized operation interface and wherein the at least one processor of the managing module is further configured to implement the operation of displaying the message on the management interface.

3. The system of claim 2, wherein the teaching module receives a message from the management interface and wherein the at least one processor of the teaching module is further configured to implement the operation of displaying the message on the personalized operation interface, the displaying the message on the personalized operation interface allowing for communication between an administrator and the user via the personalized operation interface and the management interface.

4. The system of claim 1, wherein the at least one processor of the teaching module is further configured to implement the operation of categorizing the personalized operation interface for a user as either a teacher's operational interface or a student's operational interface.

5. The system of claim 4, wherein input to the personalized operation interface from at least one of the teacher's operational interface and the student's operational interface is controlled by input operating authorization settings.

6. The system of claim 5, wherein the input operating authorization settings include a character input authorization, a sound input authorization, and an interaction input authorization.

7. The system of claim 1, wherein the personalized operation interface includes a status display area, a real-time communication area, an interaction display area, a video display area, and an interface function settings area.

8. The system of claim 7, wherein the interface function settings area includes a communication assistance function option which allows at least one of the following operations:

the student to report a problem with learning to the teacher;
the student or the teacher to report a problem with the interface to an administrator; and
the administrator to respond to the reported problem.

9. The system of claim 6, wherein the teacher has the ability to change the student's input operating authorization settings via the teacher's operational interface.

10. A computer-implemented method for monitoring and maintaining the operational integrity of online teaching groups comprising users, the users comprised of at least one student and at least one teacher distributed across a network, the method comprising:
storing and managing a connection of a user to a teaching group;
identifying user operational problems within the teaching group;
removing the user from the teaching group when an operational problem of the user is identified;
inserting the user into a test group managing area when the user is removed from the teaching group;
disabling the connection of the user to the teaching group in response to the removal of the user from the teaching group;
facilitating diagnosis and correction of the operational problem;
returning the user to the teaching group when the operational problem has been corrected;
restoring the connection of the user to the teaching group when then user has been returned to the teaching group;
monitoring a connection status of the user to the teaching group, the connection status comprising a status of the connection of the user to the teaching group;
storing connection status data of the user as a connection status record for searching, the connection status data comprising a user connection address, a time record of logging-in and logging-out, and an internet flow bandwidth;
identifying the operational problem as taking place via the user or via a server of the management interface using the connection status data;
recording a teaching process of a teaching module via a personalized operation interface to form a recording file;
determining advertisement data according to personal information settings of the user, the personal information settings of the user comprising events; and
inserting the advertisement data into the recording file.

11. The computer-implemented method of claim 10, further comprising receiving a message from a personalized operation interface and displaying the message on a management interface.

12. The computer-implemented method of claim 11, further comprising receiving a message from the management interface and displaying the message on the personalized operation interface, allowing for communication between an administrator and the user.

13. The computer-implemented method of claim 11, further comprising categorizing the personalized operation interface as either a teacher's operational interface or a student's operational interface.

14. The computer-implemented method of claim 13, further comprising controlling the input to the personalized operation interface by adjusting input operating authorization settings of at least one of the teacher's operational interface and the student's operational interface.

15. The computer-implemented method of claim 14, further comprising controlling the input to the personalized operation interface by adjusting at least one of the following in the input operating authorization settings: a character input authorization, a sound input authorization, and an interaction input authorization.

16. The computer-implemented method of claim 10, further comprising displaying at least one of the following: status information of the users, text messages provided by the users, and video images captured by the teacher.

17. The computer-implemented method of claim 13, further comprising allowing at least one of the following: the student to report a problem with learning to the teacher, the student or the teacher to report a problem with the personalized operation interface to the administrator, and the administrator to respond to the reported problem.

18. The computer-implemented method of claim 10, further comprising changing the student's input operating authorization settings via a teacher's operational interface.

19. The computer-implemented method of claim 17, further comprising displaying a notification message from the teacher or the student, describing the reported problem.

20. The computer-implemented method of claim 10, further comprising retrieving connection status data of at least one user of the teaching group.

* * * * *